United States Patent [19]

Muncke et al.

[11] Patent Number: 4,625,748
[45] Date of Patent: Dec. 2, 1986

[54] SAFETY ARRANGEMENT FOR POWER ASSISTED STEERINGS

[75] Inventors: Ludwig Muncke, Lohr; Norbert Mucheyer, Rechtenbach; Wolfgang Kauss, Lohr, all of Fed. Rep. of Germany

[73] Assignee: Mannesmann Rexroth GmbH, Fed. Rep. of Germany

[21] Appl. No.: 768,520

[22] Filed: Aug. 22, 1985

[30] Foreign Application Priority Data

Aug. 31, 1984 [DE] Fed. Rep. of Germany ....... 3432159

[51] Int. Cl.⁴ .............................................. B62D 5/07
[52] U.S. Cl. ..................................... 137/101; 60/403; 60/422
[58] Field of Search .......................... 60/399, 403, 422; 91/516; 137/101, 516

[56] References Cited

U.S. PATENT DOCUMENTS 4,461,315  7/1984  May ................................ 60/403 X

FOREIGN PATENT DOCUMENTS 2003101  3/1979  United Kingdom ................. 60/403

Primary Examiner—Robert G. Nilson
Attorney, Agent, or Firm—Harness, Dickey & Pierce

[57] ABSTRACT

In the supply of a power-assisted steering and an additional hydraulic system with fluid the power-assisted steering has priority so that when the steering is actuated the influx of fluid to the hydraulic system is correspondingly throttled by a priority valve. When a leak occurs in the hydraulic system, the influx of fluid to the hydraulic system is completely shut off when the oil level in the reservoir drops to a lower limit value. The closure of the priority valve is effected by a switch valve which is disposed in one of the control pressure lines of the priority valve and which is rendered currentless on response of the sensor for the fluid level.

8 Claims, 4 Drawing Figures

SAFETY ARRANGEMENT FOR POWER ASSISTED STEERINGS

BACKGROUND OF THE INVENTION

The invention relates to a safety arrangement for power-assisted steerings having the features set forth herein. More specifically, the invention relates to a safety arrangement for power assisted hydraulic steering systems in which a further hydraulic system is supplied from the same pump and reservoir. The arrangement insures operation of the hydraulic power steering system even if a failure or leak occurs in the other hydraulic system.

A priority valve constructed to operate by pressure balance may be provided in known manner in a fluid line leading from the pump to the additional or auxiliary system whereas the steering valve for the power-assisted steering is connected directly to the pump. The pressure difference occurring at the steering valve acts on the control piston of the priority valve in such a manner that with increasing power requirement of the steering the influx of fluid to the hydraulic system is throttled.

Furthermore, a flow-dividing valve is known (German Patent Application No. P2723490) which is also constructed as pressure balance. The input of the flow-dividing valve is connected to the pump whereas one output is connected to the line leading to the steering valve and a second output is connected to the line leading to a hydraulic system. In a regulating position in which both steering valve and hydraulic system are supplied with fluid the branch leading to the steering valve is provided with a load pressure compensation so that even with variable load pressure of the power-assisted steering the fluid amount flowing to the steering valve is kept constant. From this regulating position the priority valve is switched to a switch position in which the connection to the hydraulic system is interrupted and the entire fluid amount delivered by the pump passes to the line leading to the power-assisted steering.

If, with these types of devices, a leak occurs in the area of the additional hydraulic system, the entire fluid supply can finally be lost because the priority valve is not able to detect the fault. To avoid failure of the steering, the power-assisted steering may be connected to a separate pump which is supplied with fluid either from a separate reservoir or from a suction connection of which is located in the common reservoir deeper than the suction connection of the pump supplying the hydraulic system with fluid. If the fluid level in the reservoir drops, the influx to the hydraulic system is interrupted. However, with such a safety arrangement a second pump is necessary and consequently the economical solution with one pump and priority valve cannot be adopted.

The problem underlying the invention thus resides in providing in the supply of a power-assisted steering and an additional hydraulic system via a pump a safety arrangement which makes it possible when the level in the reservoir drops to continue reliably to supply the power-assisted steering with fluid.

SUMMARY OF THE INVENTION

In the safety arrangement of the type outlined at the beginning said problem is solved according to the invention by the features set forth in the characterizing clause of claim 1.

For safety reasons the switch valve remains in the energized state as long as the fluid level in the reservoir is high enough, in which case the control pressure difference at the steering valve is switched by the switch valve in the manner already outlined to the priority valve. If however the oil level drops, the switch valve is switched to the currentless condition and switches the priority valve over so that the hydraulic system is shut off and the entire fluid amount delivered by the pump can pass to the power-assisted steering. Thus, supply of the various consumers is possible by one pump without it being possible for an oil loss in the consumers to lead to failure of the power-assisted steering.

Advantageous further developments of the invention are characterized in the subsidiary claims. Thus, the switch valve may be arranged in the control line leading to the power-assistance valve. When the fluid sensor responds to a low fluid level, the switch valve switches the pump pressure to the priority valve so that the latter moves by spring force into the shut-off position. The switch valve can also open a connection of the control line to the reservoir, the control piston of the priority valve thereby being relieved of pressure and the priority valve being displaced by spring force and the pressure in the power-assistance circuit to the shutoff position.

BRIEF DESCRIPTION OF THE DRAWINGS

Several examples of embodiment of the invention will be explained hereinafter in detail with the aid of the drawings, wherein.

DETAILED DESCRIPTION OF THE PREFERRED EMBODIMENTS

Figure 1:
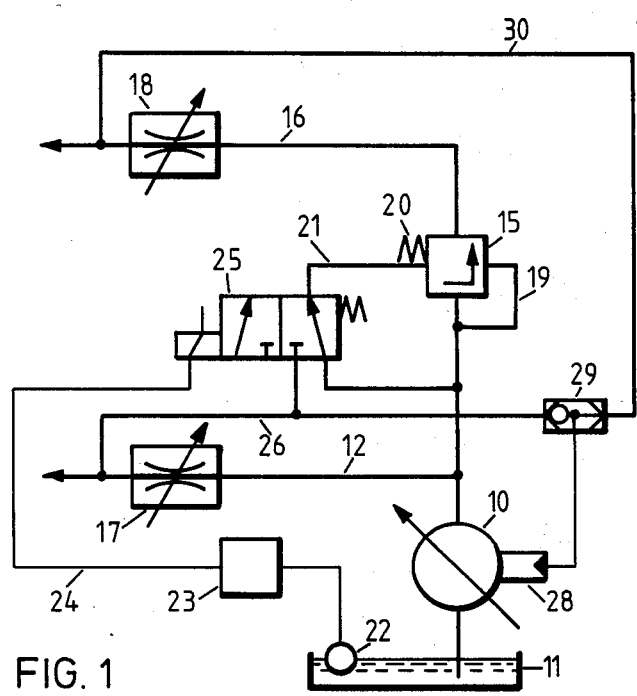
FIG. 1 is a hydraulic circuit diagram of a power-assisted steering comprising a priority valve disposed in the line to the auxiliary or additional hydraulic system and the switch valve constructed in accordance with a first embodiment.

In FIG. 1 an adjustable pump 10 conveys fluid from a reservoir 11 directly into a line 12 leading to a power-assisted steering and via a pressure balance 15 to a line 16 leading to another hydraulic consumer. For operating the power-assisted steering, not illustrated, a steering valve 17 is provided and for actuating the additional hydraulic consumer, also not shown, a valve 18 is provided. Further lines for supplying additional systems may branch off from the line 16.

The priority valve 15 is in a manner known per se a pressure balance whose control piston is subjected via a control line 19 to the pressure of the pump 10 or the pressure in the line 12 upstream of the steering valve 17 and in the opposite sense is subjected to a spring 20 and the pressure in a control line 21.

The level of the fluid in the reservoir 11 is measured by a sensor 22. In an associated evaluating circuit 23 a signal is generated on a line 24 when the fluid level in the reservoir 11 is sufficient to supply both the power-assisted steering and also the auxiliary or additional hydraulic system with fluid. In this case the signal on the line 24 energizes a switch valve 25 and brings said valve from the position shown in FIG. 1 into a switch position in which the control line 21 is subjected to the pressure downstream of the steering valve 17 in the line 26. Therefore, acting on the control piston of the priority valve 15 in addition to the spring 20 is the pressure downstream of the steering valve 17. In the opposite sense, the control piston of the priority valve receives via the control line 19 the pressure upstream of the steering valve 17 to open the priority valve 15 so that fluid can flow into the line 16.

If the steering valve 17 is actuated the pressure in the line 26 rises and the priority valve 15 is urged in a flow restricting sense in order to throttle the influx of fluid into the line 16 to the additional hydraulic system when the power requirement of the power-assisted steering increases.

The adjustable pump 10 is connected to a pump regulator 28 which is connected to a shuttle valve 29 so that the pump regulator 28 is subjected to the respective larger pressure in the control line 26 or in a control line 30 connected downstream of the valve 18 whichever is greater and adjusts the displacement volume and thus the pressure of the pump 10 in accordance with the requirements of the power-assisted steering or the hydraulic consumer.

If for example fluid escapes through a leak occurring in the line 16 the fluid level in the reservoir 11 drops until the sensor 22 indicates a level which is disposed at a minimum height absolutely essential to the reliable function of the steering. When the sensor 22 so indicates the evaluating circuit 23 disconnects the current on the line 24 and the switch valve 25 is thus switched to the currentless condition and changes to the position illustrated in FIG. 1 in which the control line 21 is connected to the line 12 so that the control piston of the priority valve 15 is subjected to the same pressure on both sides. The priority valve 15 is then closed by the spring 20 so that the line 16 is completely disconnected and the pump now only supplies the line 12 for the power-assisted steering.

Figure 2:
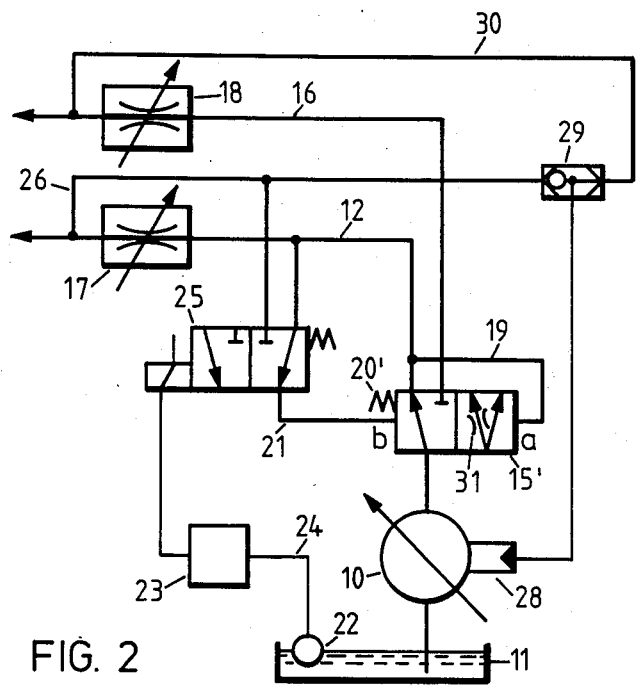
FIG. 2 is a hydraulic circuit diagram of a second embodiment comprising a priority valve for supplying a power-assisted steering and a hydraulic system and having a switch valve as in the first embodiment according to FIG. 1.

FIG. 2 illustrates a modified embodiment in which a priority valve 15' is used which in a regulating position (a) divides the fluid amount delivered by the adjustment pump 10 between the line 12 and the line 16 whereas in a switch position (b) the entire fluid flow passes to the line 12 and the line 16 is shut off. The priority valve 15' further comprises a special feature in so far as in the regulating position (a) it has a load pressure compensation. If the load pressure of the power-assisted steering changes the priority valve 15' is adjusted so that the volume of the fluid flowing through the power-assisted steering remains constant. The load pressure compensation is indicated by the throttle 31 representing a fine control edge.

As long as the switch valve 25 in FIG. 2 is energized from the sensor 22 and evaluating circuit 23, it will be shifted from the position shown in FIG. 2 so that the force of the spring 20' and the pressure downstream of the steering valve 17 in the control line 21 act on the priority valve 15'. The pressure upstream of the steering valve 17 from the line 12 acts through the control line 19 to urge the valve 15' to the regulating position (a) since this pressure is greater than the pressure in line 26 and the spring force.

If the switch valve 20 by response of the sensor is switched to the currentless state because the fluid level in the reservoir drops, it moves to the illustrated position in which, as in FIG. 1, the pressure in the line 12 acts on both sides on the piston of the priority valve so that the latter is displaced by the spring 20 into the illustrated position in which the line 16 is shut off and the entire fluid flow of the pump 10 passes into the line 12 to the power-assisted steering.

Figure 3:
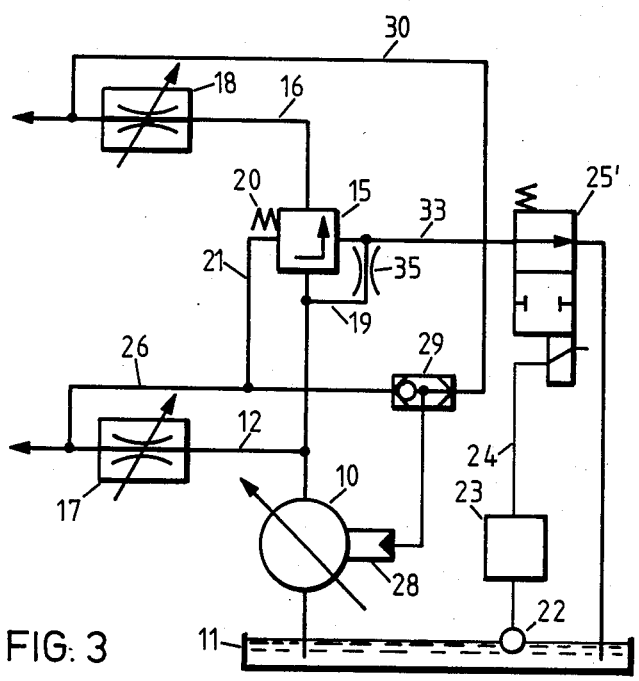
FIG. 3 is a hydraulic circuit diagram of a third embodiment comprising a power-assisted steering, a priority valve provided in the line to an additional hydraulic system and a switch valve in a return line.

FIG. 3 represents a further embodiment in which the same components are identified by the same reference numerals are used as in FIG. 1. However, in contrast to Figure 1 a switch valve 25' is disposed in a connecting line 33 which leads from the control line 19 to the reservoir. Also in FIG. 3, the control piston of the priority valve 15 is subjected to the control pressure difference at the steering valve 17. The fluid sensor 22 responds when the fluid level in the reservoir drops and the switch valve 25' will be switched to the currentless condition so the pressure in the control line 19 is decreased because the connecting line 33 is opened towards the reservoir 11. Then, the priority valve closes by the force of the spring 20 and additionally by the pressure in the control line 21. This provides additional reliability in the shutting off of the auxiliary hydraulic system.

Also provided in the control line 19 is a throttle 35 which prevents the line 12 being connected directly to the reservoir when the switch valve 25' is switched to the currentless condition. The throttle 25 is so dimensioned that the leakage from the line 12 is small.

Figure 4:
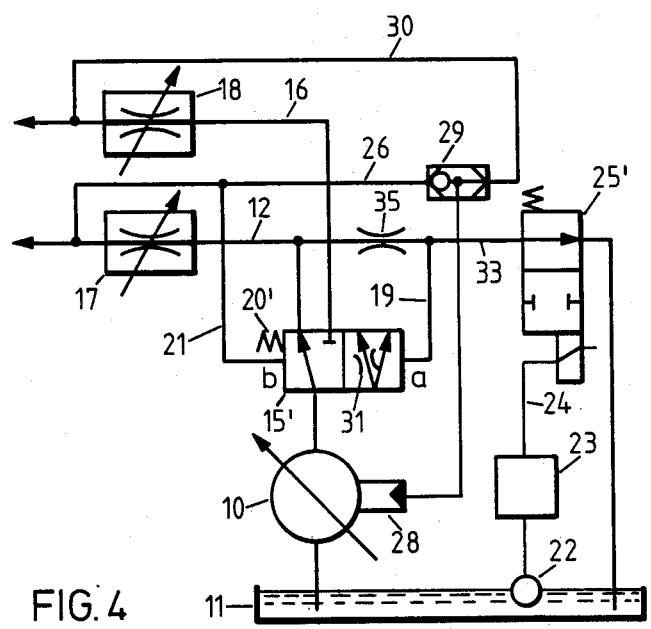
FIG. 4 is a hydraulic circuit diagram of a fourth embodiment comprising a priority valve according to FIG. 2 for supplying a power-assisted steering and a hydraulic system having a switch valve according to FIG. 3.

FIG. 4 illustrates a further embodiment whose priority valve 15' corresponds to the priority valve already explained in FIG. 2 and a switch valve 25' like that of FIG. 3. In this embodiment like that of FIG. 3 when the current is disconnected from the switch valve 25' the control pressure in the line 12 upstream of the steering valve 17 in the control line 19 is reduced via the connecting line 33 to the reservoir 11 so that by the control pressure in the control line 21 downstream of the steering valve the spring 20 cause the priority valve 15' to be switched from the regulating position (a) to the switch position (b) in which the additional hydraulic consumer is shut off and the entire fluid flow of the adjustment pump 10 passes to the power-assisted steering.

We claim:

1. In a safety arrangement for fluid power-assisted steering and at least one additional hydraulic system comprising a priority valve connected to a pump for dividing the amount of fluid delivered by the pump from a reservoir between a steering valve of the power-assisted steering and the additional hydraulic system, said priority valve being responsive to steering demand for increasing the flow of fluid to the additional hydraulic system while throttling the amount flowing to the steering valve when the steering is not actuated and upon actuation of the steering increasing the amount flowing to the steering and throttling the amount flowing to the additional hydraulic system, the improvement characterized by a level sensor for detecting the level of fluid in the reservoir, a movable control piston disposed within the priority valve operable to move in response to a control pressure to a position causing the restriction of fluid flowing to the additional hydraulic system, and a switch valve communicating with the level sensor and the priority valve operable to provide the control pressure to the movable control piston when the level of the fluid in the reservoir falls below a predetermined value.

2. In a safety arrangement as set forth in claim 1 wherein the switch valve is operative to provide pressure downstream of the steering valve to the control piston when the level of the fluid in the fluid reservoir is above the predetermined level so that the priority valve will be maintained in its flow dividing position and for subjecting the control piston to pump output pressure when the level falls below said predetermined level for shifting said priority valve to the position for shutting off the flow to the hydraulic system.

3. In a safety arrangement as set forth in claim 2 wherein the pressure supplied by the switch valve acts on one side of the control piston and is supplemented by spring means, the other side of the control piston being subjected to pump output pressure.

4. In a safety arrangement as set forth in claim 2 wherein the priority valve includes throttling means for throttling the flow to the steering valve when in the flow dividing position in response to pump output pressure.

5. In a safety arrangement as set forth in claim 1 wherein the switch valve is disposed in a line connecting the pump output with one side of the control piston and is operative to vent the one side to the reservoir when the level falls below the predetermined level.

6. In a safety arrangement as set forth in claim 5 further including a throttle in the line connecting the pump output to the one side of the control piston.

7. In a safety arrangement as set forth in claim 5 wherein the priority valve includes throttling means for throttling the flow to the steering valve when in the flow dividing position in response to pump output pressure.

8. In a safety arrangement as set forth in claim 6 wherein the priority valve includes throttling means for throttling the flow to the steering valve when in the flow dividing position in response to pump output pressure.

* * * * *